PULSE MODIFYING CIRCUIT ARRANGEMENT

Filed Aug. 22, 1952

INVENTOR.
James S. Harris

BY Charles H. Brown
ATTORNEY 2,810,784

PULSE MODIFYING CIRCUIT ARRANGEMENT

James Stallings Harris, Old Greenwich, Conn., assignor to Radio Corporation of America, a corporation of Delaware Application August 22, 1952, Serial No. 305,968

4 Claims. (Cl. 178—69)

The invention relates to pulse signalling systems and particularly to circuit arrangements for modifying the time of occurrence of one or both transitions of a pulse signal. Specifically, the invention pertains to circuit arrangements for varying the weight of telegraph signals.

In telegraph or other pulse signalling systems involving the transmission of intelligence by pulse or other signals of the bi-static or "two-condition" type, it is often found that the signal becomes so distorted in transmission that the receiving apparatus will not function properly. This is more noticeable in radio wave transmission systems than on wire line systems, although it does occur to some extent on the latter. Bi-static or "two-condition" signals are those wherein the desired intelligence is expressed in terms of alternating electrical currents having two discrete values. One such signal is that termed a "polar signal" wherein a signal element of one nature is transmitted by a current of positive polarity and a signal element of opposite nature is transmitted by a current, preferably of the same amplitude, but of opposite polarity. Another type of bi-static signal is that where signal elements of one nature are transmitted by a current of given amplitude and signal elements of opposite nature are transmitted by currents of the same polarity but of substantially different amplitude. Perhaps the most common form of telepgraph signal is the so-called "neutral signal" wherein signal elements of one nature are transmitted as signal currents of given polarity and amplitude and the signal elements of opposite nature are indicated by zero current.

Telegraph signals or pulse trains of the type described often are deleteriously affected by the communication medium through which they are transmitted. For example bursts of static occurring in a radio transmission path have a tendency to "fill" the spaces between pulse elements. This filling tends to elongate the signal elements at the receiver. It is highly desirable that some means be provided either at the transmitter or the receiver, or both, to correct for such alteration of the signal characteristics. For the example given, the transmitter might be so arranged as to distort the perfect keyed signal to a predetermined degree to transmit an "imperfect" signal which at the receiving end of the system will appear almost the same as the keyed perfect signal. In other circumstances it may be desirable to transmit the signal as it is generated and alter the received signal in the proper manner to regenerate the desired signal substantially as it was generated and transmitted.

In practice both methods are used and there have been several suggestions in the prior art as to how such signal alterations may be accomplished. These arrangements in use have proved to be entirely too complex and too expensive. Moreover, for practical use in the prior art arrangements it has been difficult to adjust the weight of the signals. Another shortcoming of the prior art arrangements is that different types of circuits are employed for receiving than for transmitting. Theoretically, correction of distortion brought about by transmission path distortion should be more readily corrected at the ends of the path if essentially the same deliberate distorting circuit arrangement is used at both ends.

An object of the invention is to provide an improved pulse delaying circuit arrangement.

Another object of the invention is to provide an improved circuit arrangement for converting a square wave signal into a trapezoidal wave signal.

A more specific object of the invention is to provide an improved circuit arrangement for varying the weight of bi-static telegraph signals, for use either at the transmitter or at the receiver or at both.

A further object of the invention is to provide an improved pulse modifying circuit arrangement having a control means operable at a great distance from the pulse modifier proper.

Still another object of the invention is to provide a simplified circuit arrangement for delaying the trailing transition of a pulse signal train to a fixed or to an adjustable degree.

The objects of the invention are attained by means of a trapezoidal wave generator circuit comprising a grid-controlled cathode follower electron discharge system and a constant current electron discharge structure connected in series with an adjustable cathode resistance element. Operating potential is applied across the series circuit described and electron storing device is connected between the junction of the electron discharge devices and an operating potential point. The electron discharge devices are so biased that a square wave voltage applied to the grid of the electron discharge system will produce a voltage wave at the cathode thereof having a sloping trailing edge. The degree of slope is varied by adjustment of the cathode resistor which changes the current passing through the series circuit and hence the charging or discharging time of the electron storing device. If a substantially constant amplitude square wave signal is applied to the input circuit, a substantially constant output trapezoidal wave is obtained. Changing the slope of the latter then changes the time relation of any given point on the sloping trailing edge with respect to the vertical leading edge.

A limiter stage may precede the trapeziodal wave generator to limit the applied square wave for such applications that do not have a constant amplitude input wave and demand a particular value of potential at a point on the slope of the trapezoidal wave corresponding to the operating point of a subsequent utilization circuit, such as a bistable reciproconductive circuit operating as a telegraph signal regenerator.

The invention will be described in terms of a working embodiment, given by way of example only, and illustrated by the accompanying drawing in which.

Figure 1:
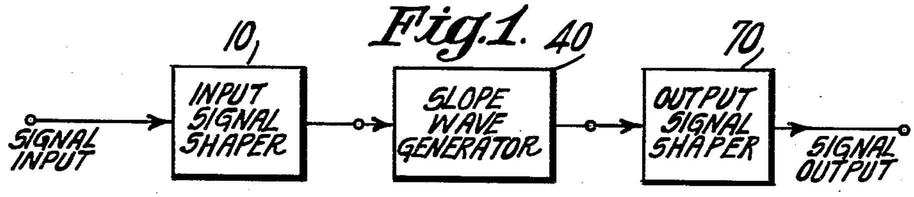
Fig. 1 is a functional diagram of a circuit arrangement according to the invention which could be located at either a telegraph transmitter or receiver.

Referring to Fig. 1, there is shown a functional diagram of a circuit arrangement according to the invention. An input signal of roughly square wave form, for example a telegraph signal, is applied to an input signal shaper 10 which produces an essentially square wave output of substantially constant amplitude. Any known form of limiter circuit consistent with the type of input signal may be used, but the differential amplifier type to be described hereinafter has definite advantages. If the input signal is a square wave of constant amplitude, as often may be the case, the input signal shaper may be dispensed with, of course. The output of the signal shaper 10 is applied to a slope generator 40 which produces an output wave of trapezoidal form substantially equal to the applied square wave input pulse plus a sloping trailing edge. As will later be described, the slope generator 40 has control means whereby the degree of slope can be varied over a wide range. The trapezoidal voltage wave thus produced is applied to an output signal shaper 70, which for telegraph and the like purposes is a bistable reciproconductive circuit having a triggering potential level intermediate the top and bottom levels of the slope wave.

As employed herein the term "reciproconductive circuit" is construed to include all two tube regenerative devices in which conduction alternates in one or the other tube in response to applied triggering potential. The term "multivibrator" is sometimes applied to this circuit and the term "locking circuit" is sometimes applied to a bistable reciproconductive circuit which is one in which two triggers are required to switch from one stable state to the other and return.

The adjustment of the slope generator circuit 40 will vary the slope, prolonging the input pulse by a varying sloping edge. The bistable reciproconductive circuit will be triggered to one stable state at a time relatively fixed with respect to the leading edge of the input pulse and triggered to the other state at a time after the trailing edge of the input pulse depending on the slope of the trapezoidal wave.

Figure 2:
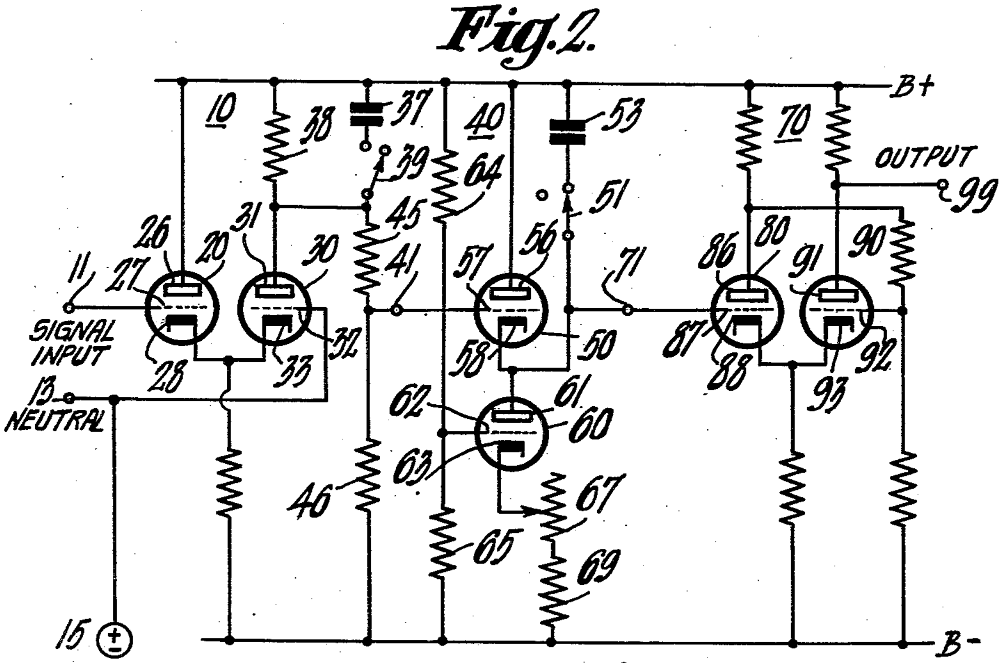
Fig. 2 is a schematic diagram of a circuit arrangement for performing the functions enumerated in Fig. 1.

Referring to Fig. 2, there is shown a schematic diagram of a circuit arrangement according to the invention wherein the three functions previously described are accomplished by means of triode vacuum tubes and associated components.

The input signal shaper 10, as shown, is a limiter circuit of the differential amplifier type. It may be of any known circuit suited to the purpose. For example, a bistable reciproconductive circuit may be used here. If the input signal applied to terminals 11, 13 is polar, with respect to the "neutral" connection at the terminal 15 and of sufficient amplitude, the voltage excursion of the anode 31 of the tube 30 will be between definite limits as determined by the "no-current" conditions for the anode 31 when the grid 27 of tube 20 is sufficiently positive, and the "full-current" condition for the anode 31 when grid 27 is sufficiently negative to completely cut off current flow through the anode 26 of the tube 20.

The slope generator circuit comprises electron discharge structures in the form of two triode vacuum tubes 50 and 60 connected in a series arrangement, with one tube 60 acting as a constant current cathode resistance for the other tube 50. The constant current characteristic is obtained by the use of a large amount of degeneration in the cathode circuit of the tube 60 by providing a large voltage drop across the grid resistor 65 as compared with grid cutoff value, and consequently across the adjustable cathode resistor 67 and the series fixed resistor 69. The resistor 69 is provided as a limiting resistance to prevent excessive current when the adjustable resistor 67 is at the minimum resistance setting. The magnitude of the constant current is determined by the relationship between the voltage drop across the grid resistor 65 and the effective cathode resistance $R_k$ furnished by the cathode resistors 67 and 69.

Thus a change in the setting of the adjustable resistor 67 will effect a change in magnitude of the constant current through the tube 60. A substantially constant amplitude square wave, which may be a portion of the signal output from the input signal shaper 10 taken from a potentiometer consisting of resistors 45 and 46, is applied to the slope generator input terminal 41. If the switch 51 is in the open position, then the tube 50 will act as a straight cathode follower and repeat the signal as applied to the grid 57. The setting of the slope control resistor 67 will have a negligible effect on this operation.

When the switch 51 is closed so that a capacitor 53 is connected in the circuit, a positive signal transition at the grid 57 of the tube 50 will be accurately repeated at the cathode 58 and the terminal 71, since the low impedance of the tube 50 functioning as a cathode follower will discharge the capacitor 53 almost instantly. A negative signal transition at the grid 57, however, will cause the tube 50 to cut off momentarily, as the capacitor 53 tends to hold the instantaneous cathod voltage constant. Now with the tube 50 blocked or cut off, the circuit of the constant current tube 60 will charge the capacitor 53 (negatively in the circuit as shown) and the voltage at the cathode 58 of the tube 50 will therefore drop at a constant rate until the cut-off voltage is reached and the tube 50 again draws current. Because the rate of voltage drop across a given capacitive reactance element is determined by the rate of current flow into it, it can be seen that the adjustment of the slope control resistor 67, which determines the magnitude of current through the tube 60, is therefore effective in controlling the rate of voltage drop across the capacitor 53 following a negative signal transition at the grid 57 of the tube 50.

A positive signal transition applied to the terminal 41 will then appear at the terminal 71 with negligible delay, while the delay in repetition of a negative transition will be dependent upon the size of the capacitor 53 and the rate of constant current flowing into it.

A capacitor 37 may be connected across the anode resistor 38 in the input signal shaper circuit 10 by means of a switch 39 to cause a fixed delay in the repeating of a positive transition, and thus produce a net delay on either transition by adjustment of the variable delay control 67.

The capacitors 37 and 53 may be returned to "Neutral" or to B— if desired, but ordinarily the preferred return is to B+, as shown. The latter connection is preferred because the capacitor 53 is then directly connected to the anode 56 and the cathode 58 so that the tube 50 and the capacitor 53 are the only components through which current flows to change the potential across the capacitor 53. This prevents interaction between this circuit and similar circuits as might occur if the current were made to flow through the impedance elements of the power supply.

Under certain conditions it may be preferable to vary the voltage applied to the grid 62 of the constant current tube 60 by substituting a variable potentiometer in place of the resistors 64 and 65 and leaving the resistor connected to the cathode 63 fixed.

It is a special feature of the invention that the delay control resistor 67 and the resistors 64 and 65 have no component of signal voltage across them and that they can be remotely located from the rest of the circuit with only normal precautions against pickup of interfering signals which could affect the operation of the circuit. A number of such control resistors could be connected to their associated circuits with no cross-coupling effects by conductors enclosed in a single shielded cable. Since the resistor 67 has only a relatively low voltage component across it and also is only a two-terminal device, it is preferred that this resistor be used as the slope control.

The output signal shaper 70, as shown in Fig. 2, is a cathode coupled bi-stable lock over reciproconductive circuit with component values such that the signal transitions as presented to the terminal 71 and the grid 87 of the tube 80 by the slope generator 40 will cause it to produce a square wave output signal train at the output terminal 99. Normally, the output signal shaper 70 would be adjusted to trigger on a voltage level near the center of the excursion range of the signal obtained at the terminal 71. A number of known circuits may be used for the output signal shaper; a differential amplifier might well be used, if desired.

The circuit arrangement specifically shown in Fig. 2 is well suited for compensating for characteristic distortions suffered by telegraphic signals or the like when transmitted over channels of insufficient bandwidth or unstable gain and/or phase characteristics, either land line or radio channels. In such cases, the circuitry may be considered to provide "regeneration" in so far as correction of characteristic distortion is concerned.

Figure 3:
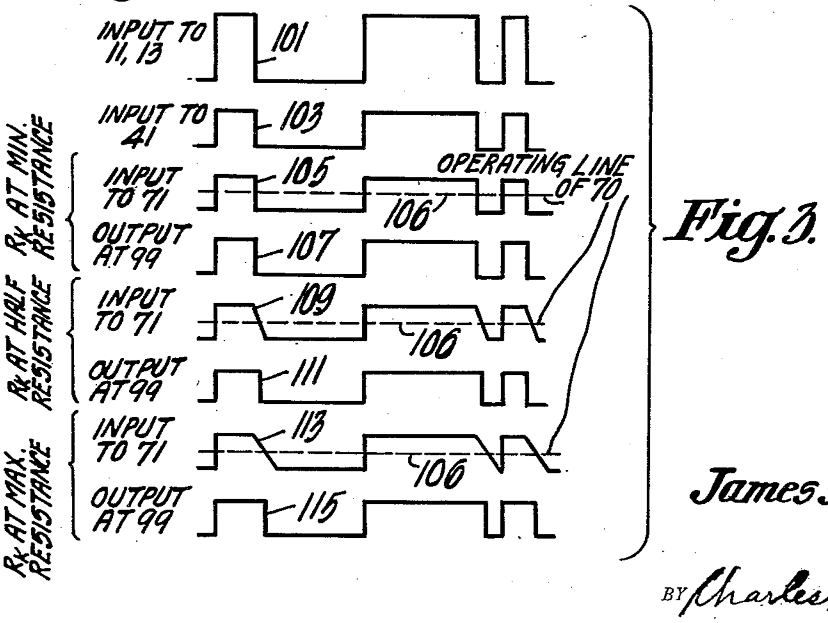
Fig. 3 is a graphical representation of operating characteristics of the circuit arrangement shown in Fig. 2.

Referring to Fig. 3, there is shown a number of curves which graphically illustrate the operation of the circuit arrangement of Fig. 2. The uppermost curve 101 represents an idealized telegraph type signal which is applied to the input terminals 11 and 13. Direct current neutral signals are usually applied with the neutral terminal 15 connected to an earth ground and this connection is also preferable for polar signals. The limiter 10 and the output voltage divider produce a signal at the terminal 41. This signal is in strict time phase and is represented by the second curve 103. When the slope control resistor 67 is set to provide minimum cathode circuit reactance $R_k$, the output of the slope generator 40 is as represented by the curve 105. The dashed line 106 in all cases represents the triggering potential level of the output signal shaper 70. Under these conditions the output signal shaper repeats the input pulses without delay, as represented by the next curve 107. When the cathode resistance $R_k$ is about half the maximum value, the output of the slope generator 40 at the terminal 71 is as represented by the curve 109; a decided slope being found at the negative transition or trailing edge of each pulse. As represented by the following curve 111, the output signal shaper 70 repeats the positive transition immediately, but delays the negative transition until the slope has dropped to the triggering level represented by the dashed line 106, whereupon the negative transition of the output signal at the terminal 99 is added to produce a widening of the pulse as applied to the input signal shaper 10. The curves 113 and 115 show a similar, but amplified, action obtained when the cathode resistance $R_k$ is at maximum value.

In practice, the maximum delay should be about two-thirds of the normal spacing interval, but in multiplex circuit arrangements care should be taken that the delay period can not extend over a period so long as to allow the operator to eliminate a channel signal element from the aggregate signal element by improper adjustment of the slope control resistor 67.

If greater precision of fixed delay is required than is afforded by the circuit arrangement of Fig. 2, with the switch 39 closed, two such delay circuits in accordance with the invention may, with proper phasing, be cascaded with one circuit arranged to produce a fixed delay on one transition and the other circuit arranged to produce a controllable delay on the other transition, thereby to produce a net delay on either transition with separate or ganged delay controls.

When cascading the circuits according to the invention, only one limiter, that at the input, is necessary; and often the maximum amplitude level only need be limited, as it is only necessary that the given slope wave begin at the same relative time in order to trigger the output signal shaper at the same relative time with respect to the remainder of the input pulse.

Where the signal is poly-static or comprises more than two conditions and delay corrections are required, it is suggested that decoding devices be arranged to separate the signal components into a multiplicity of bi-static or two-condition signals, and each bi-static signal separately controlled, as previously described, after which correction the several bi-static signals may be combined into a poly-static signal, similar to the original signal, except with the desired delay conditions added.

In an actually operated and tested pulse modifying circuit wired according to Fig. 2, the following component parts values were used:

| Component | Reference No. | Value |
|---|---|---|
| Capacitor | 53 | 0.25 μfd. |
| Resistors | 38 | 39 kilohms. |
| | 45, 46 | 680 kilohms. |
| | 64 | 820 kilohms. |
| | 65 | 120 kilohms. |
| | 67 | 500 kilohms variable. |
| | 69 | 15 kilohms. |
| Tubes | 20, 30, 50, 60, 80, 90 | ½ 12AT7. |

A square wave telegraph signal of 21³⁄₇ C. P. S. repetition rate, varying in amplitude between 14 and 60 volts was applied to the terminals 11 and 13 with terminal 15 at ground. An output square wave signal of 20 volts amplitude was derived between the output terminal 99 and ground, ground potential being established substantially mid-way between B− and B+.

Other values can be readily determined for use in other applications as will be obvious to one skilled in the art, and of course transistor circuits equivalent to the tube circuits shown can be used if desired.

The invention claimed is:

1. A circuit arrangement for modifying the duration of a signal wave comprising substantially rectangular pulses having substantially steep leading and trailing edges and substantially limited amplitude, including a cathode follower circuit comprising an electron discharge device having an anode, a control electrode and a cathode, a resistance element connected to said cathode of said electron discharge device, a capacitor connected between said anode and cathode of said electron discharge device, connections to apply direct operating potential across the series circuit comprising said resistance element and said capacitor, means interposed in series with said resistance element to maintain constant current flow in said series circuit, means to apply said substantially rectangular pulses to said control electrode of said electron discharge device, thereby to produce a wave of output pulses at said cathode of said electron discharge device, said output pulses having substantially steep leading edges, a flat top, and sloping trailing edges, and a bistable reciproconductive circuit connected to said cathode to reshape said output pulses so that said output pulses have substantially steep leading and trailing edges spaced farther apart in time than the leading and trailing edges of the said pulses of said signal wave applied to said control electrode of said electron discharge device.

2. A telegraph signal repeating, regenerating and weighting circuit arrangement including a cathode follower circuit comprising a vacuum tube having an anode, a control element and a cathode, an electron discharge structure having an anode electrode connected to the cathode of said vacuum tube, a control electrode and a cathode electrode, a variable resistor connected to said cathode electrode, means to apply direct operating potential across the series circuit defined by said variable resistor, said electron discharge structure and said vacuum tube, a capacitor connected between said anode and said cathode of said vacuum tube, means coupled to said control element of said vacuum tube for applying a telegraph signal of recurring pulses susceptible of random variations in said recurrence thereof to the control element of said vacuum tube, and a bistable reciproconductive circuit coupled to said cathode of said vacuum tube for producing a train of pulses in fixed phase relationship with and in response to said applied telegraph signal, the duration of the pulses of said train being determined by the current flow in said capacitor according to the setting of said variable resistor.

3. A signal repeating, regenerating and weighting circuit arrangement including a cathode follower circuit comprising an electron discharge device having an anode, a control element and a cathode, an electron discharge structure having an anode electrode connected to the cathode of said electron discharge device, a control electrode and a cathode electrode, a variable slope control resistor connected to said cathode electrode, means to apply direct operating potential across the series circuit defined by said electron discharge structure, said variable slope control resistor, and said electron discharge device, a capacitor connected between said anode and said cathode of said electron discharge device, means to apply direct operating potential to said control electrode of said electron discharge structure to produce a substantially constant current flow through said series circuit and said capacitor, means to apply a signal of recurring pulses susceptible of random variations in the recurrence thereof to said control element of said electron discharge device, and a bistable reciproconductive circuit coupled to said cathode of said electron discharge device to produce a train of pulses in fixed phase relationship with and in response to said applied signal, regardless of said random variations.

4. In a telegraph system having a transmitter portion and a remotely located receiver portion, a weight adjusting circuit in at least one of said portions, said weight adjusting circuit comprising an input signal shaper to which a telegraph signal is applied, an output circuit coupled to said input signal shaper for deriving a shaped telegraph signal therefrom, a slope wave generator for providing a sloping trailing edge at negative transitions of a telegraph signal applied thereto, said slope wave generator comprising a cathode follower electron discharge device having an anode, a cathode, and a control grid, means connecting said control grid to said output circuit of said input signal shaper, means connected to said anode for applying thereto a unidirectional potential that is positive with respect to a point of reference potential, a constant current electron discharge device having an anode electrode, a cathode electrode, and a control electrode, means connecting said anode electrode of said constant current device to said cathode of said cathode follower device, a variable resistor connected between said cathode electrode of said constant current device and said point of reference potential, a resistor connected between said anode of said cathode follower device and said control electrode of said constant current device, a resistor connected between said control electrode of said constant current device and said point of reference potential, a capacitor connected between said anode and said cathode of said cathode follower device, an output signal shaper comprising a multivibrator having input and output circuits, means connecting said input circuit of said multivibrator to said cathode of said cathode follower device, and means connected to said output circuit of said multivibrator for deriving a telegraph signal therefrom.

References Cited in the file of this patent

UNITED STATES PATENTS

| | | |
|---|---|---|
| 2,250,202 | Matusita | July 22, 1941 |
| 2,294,956 | Buckingham | Sept. 8, 1942 |
| 2,409,012 | Bliss | Oct. 8, 1946 |
| 2,546,813 | Anderson | Mar. 27, 1951 |
| 2,568,019 | Martin | Sept. 18, 1951 |
| 2,578,643 | Hayslett | Dec. 11, 1951 |
| 2,589,807 | Higinbotham | Mar. 18, 1952 |
| 2,666,891 | Weidmann | Jan. 19, 1954 |